March 12, 1935.   J. S. FENZEL ET AL   1,993,960
APPARATUS FOR WELDING TUBULAR ARTICLES
Filed July 7, 1928   4 Sheets-Sheet 4

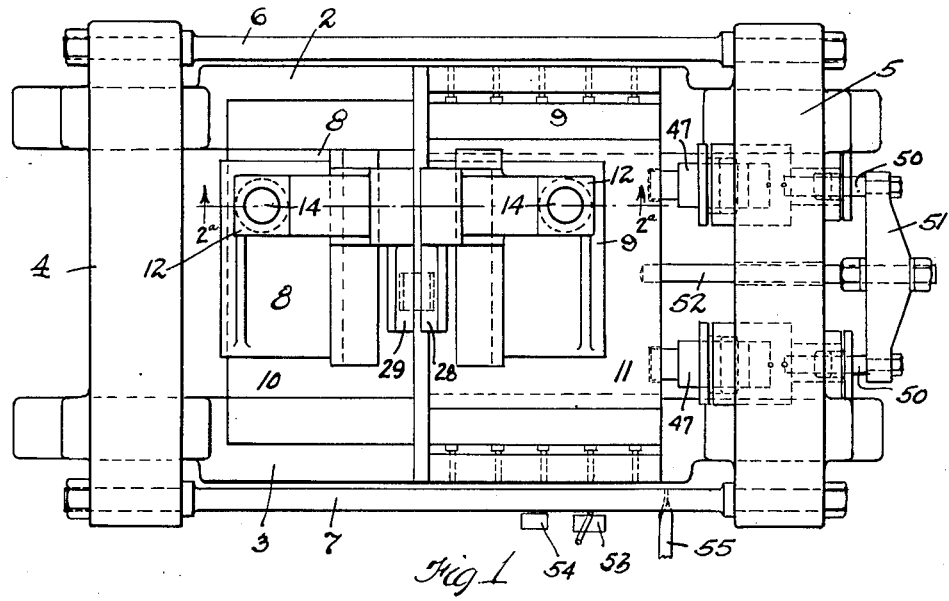
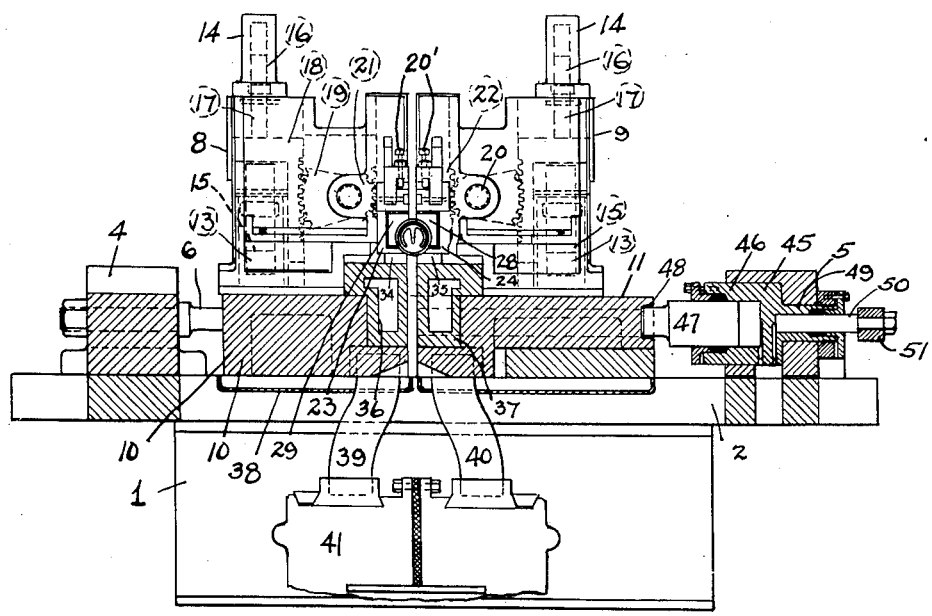

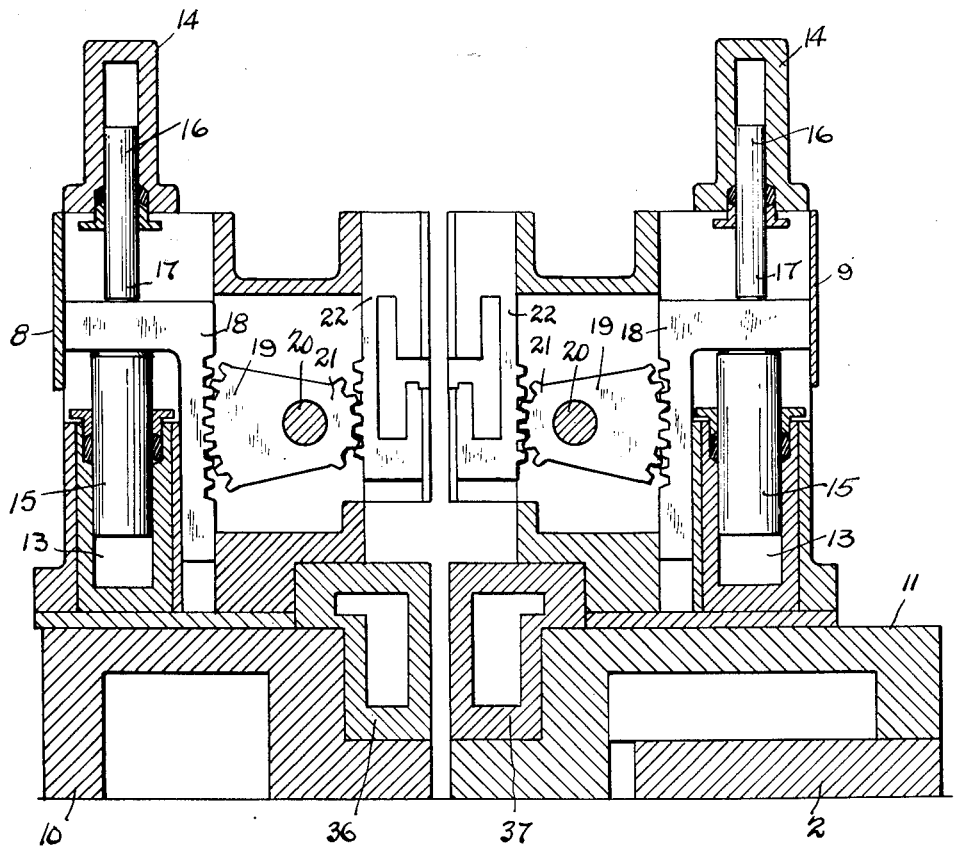
Fig. 2-A

INVENTORS
Jacob S. Fenzel and
BY Harry H. Bound.
Fay, Oberlin & Fay
ATTORNEYS.

Patented Mar. 12, 1935

1,993,960

UNITED STATES PATENT OFFICE 1,993,960

APPARATUS FOR WELDING TUBULAR ARTICLES

Jacob S. Fenzel, Cleveland, and Harry H. Bound, Lakewood, Ohio, assignors to The Cleveland Welding Company, Cleveland, Ohio, a corporation of Ohio Application July 7, 1928, Serial No. 290,959

1 Claim. (Cl. 219—5)

This invention, relating, as indicated, to methods of and apparatus for electric welding, has more particular reference to butt welding, and its primary object is the provision of a process and suitable mechanism for use in the welding together of the contiguous edges or ends of small rings or generally tubular-shaped articles produced by the rolling or bending of an initially flat blank of sheet or plate metal.

Articles of the type referred to have heretofore been manufactured by a rather elaborate and costly process involving several distinct operations and requiring the employment of considerable manual effort. The present invention provides a process which can be effected by one operator and at a greatly reduced cost, a suitable apparatus being employed and the welding carried out in a manner that more expeditiously and regularly produces articles of uniform dimensions having satisfactorily united ends or edges. In general, this improved method contemplates clamping the edges or ends to be welded in closely contacting relation, passing a welding current of electricity from one end or edge to the other in order to heat the metal and raise it to a welding temperature and then forcing the adjacent molten parts together, this resulting in upsetting the fused metal along the line of weld and coalescing such metal to form a homogeneous union having the desired stress-resisting characteristics.

To the accomplishment of the foregoing and related ends, said invention, then, consists of the means hereinafter fully described and particularly pointed out in the claim, the annexed drawings and the following description setting forth in detail one method and one type of product exemplifying our invention, such disclosed procedure and type of product constituting, however, but one of several applications of the principle of our invention.

In said annexed drawings:—

Figure 3:
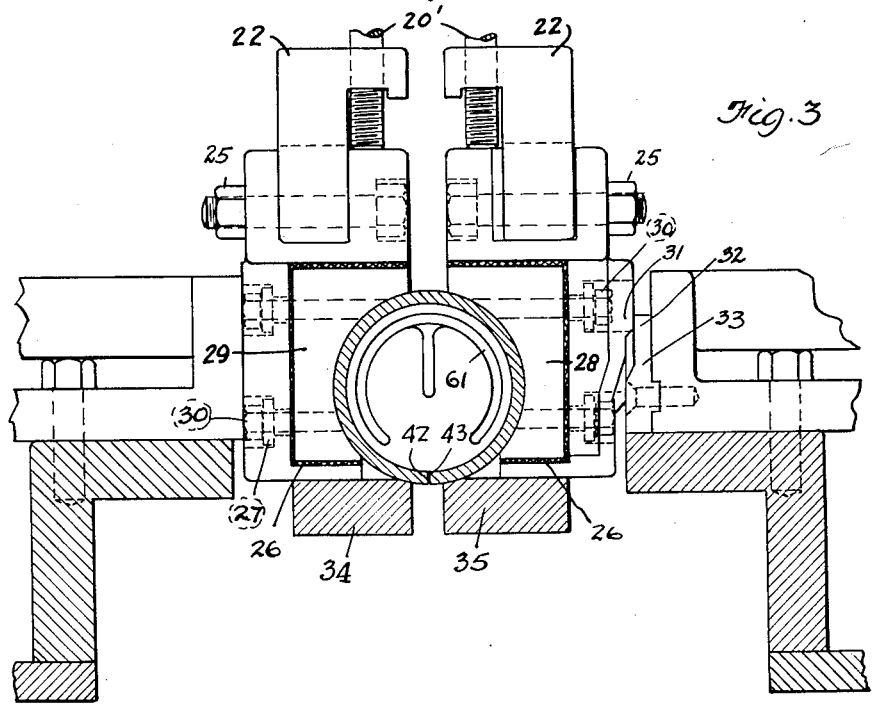
Figure 4:
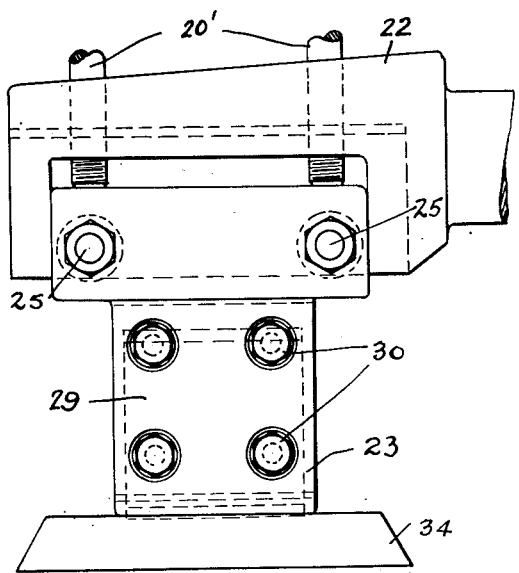
Figure 5:
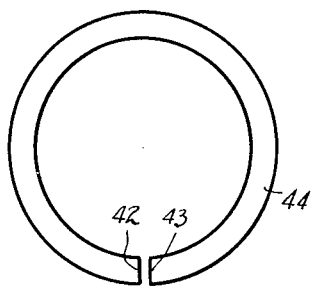
Figure 6:
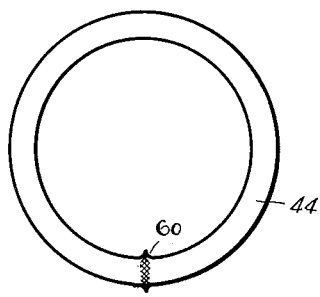
Figure 7:
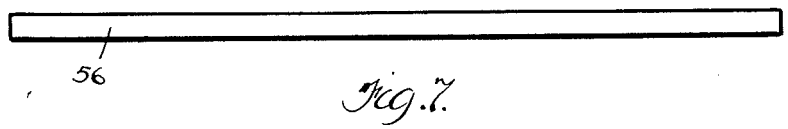
Figure 8:
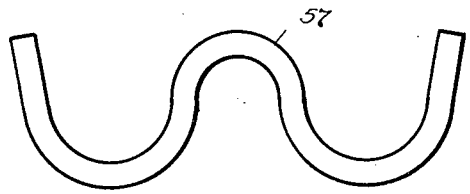
Figure 9:
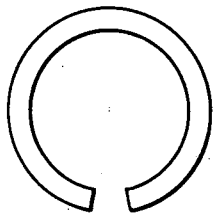
Figure 10:
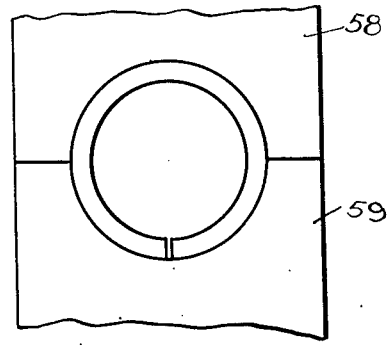

Fig. 1 is a plan view of one form of apparatus adapted for carrying out the improved welding process contemplated by this invention; Fig. 2 is a partly sectional and partly fragmentary front elevation of the apparatus illustrated in Fig. 1; Fig. 2A is a part section and part elevation taken on the plane indicated by the line 2a—2a of Fig. 1; Fig. 3 is a fragmentary and partly sectional detail view showing the principal operating parts and an article clamped in position for the heating and welding processes; Fig. 4 is a side elevation of one of the clamping devices and electrodes shown in the preceding figures; Fig. 5 is an end elevational view illustrating the appearance of a representative article prior to the welding of the edges; Fig. 6 is an end elevational view illustrating the appearance of the same article after the welding has been effected; Fig. 7 is an edge view of a flat blank of bar or plate stock from which articles of the shape shown in Fig. 5 are produced; Fig. 8 is an edge view of the blank shown in Fig. 7 after the initial operation of a series which finally produces articles having the appearance depicted in Fig. 5; Fig. 9 is a similar view of the same blank after having been subjected to a further operation; and Fig. 10 is a diagrammatic end elevation showing the final closing operation employed for converting blanks of the shape illustrated in Fig. 9 into blanks of the shape illustrated in Fig. 5.

In the drawings, and with particular reference to Figs. 1 to 4, inclusive, this invention, or more exactly, one form of apparatus for effecting the process, is shown as comprising a supporting base 1, upon which are mounted the frame members 2 and 3, these members near their outer ends, carrying two transverse parts 4 and 5 whose ends are adjustably connected by the tie rods 6 and 7. Between the tie rods 6 and 7, and positioned upon the frame members 2 and 3, are two clamping assemblies 8 and 9, the former being stationarily or immovably mounted upon a block 10 and the latter being secured to a shiftable block or slide 11. Each of the clamping device assemblies comprises or embodies a vertical standard 12 which houses a cylinder 13 and carries a cylinder 14, these cylinders in both structures being in vertical alignment and adapted to receive the opposite piston ends 15 and 16 of a piston rod 17, to which is connected a rack 18 that coacts or intermeshes with the outer and larger segment of a gear 19. The pistons 15 and 16 are actuated in the cylinders 13 and 14 by hydraulic or other pressure means which is supplied thereto from a source not shown. The pistons 15 are employed to move upwardly the racks 18 and the pistons 16 are employed to return such racks 18 to their lower position. The gears 19 are oscillatably journaled upon shafts 20 mounted in the standards 12 and their inner ends are provided with segments 21 which interengage with the teeth of two vertically reciprocable racks 22, these racks being pinned to the clamp holders 23 and 24 by bolts 25. Secured to the clamp holders 23 and 24, and suitably insulated therefrom by the non-conducting material indicated at 26 and 27, are two clamping jaws 28 and 29 which are removably held by stud bolts 30 and have an interior contour and dimensions corresponding to those of the work to be welded.

The clamping jaw 29, through the connections above described, may be given a vertical movement by the pistons 15 and 16 shown to the left in Fig. 2, and the clamping jaw 28 may be similarly moved by the pistons 15 and 16, shown to the right in the same figure, the pistons 15 being adapted to exert the necessary clamping force and the pistons 16 serving to elevate the clamp holders preparatory to the positioning of a new piece of work. In addition to its vertical movement, the clamp holder 24, and therefore the clamping jaw 28, receives a horizontal motion towards and away from the clamping jaw 29, this motion being imparted by the co-operating cams 31 and 32, the former constituting part of the clamp holder 24 and the latter formed on an insert 33 removably bolted to an extension of the slide 11.

Beneath the clamping jaws 28 and 29 are two spaced electrodes 34 and 35, which are mounted upon conducting bases 36 and 37, such bases and the blocks 10 and 11 being insulated from the frame members 4 and 5 by a dielectric material 38 and connected to the terminals 39 and 40 of the secondary winding of a transformer 41 which supplies welding current to the electrodes 34 and 35 and to the contacting work in the manner hereinafter more fully described in connection with an explanation of the welding operation in which the edges 42 and 43 of the ring or similar article 44 are heated to a high temperature and then upset by an enforced pressure and caused to unite.

For exerting the pressure necessary for forcing the heated edges or ends 42 and 43 into welding contact, there is provided a ram consisting of a plurality of double-ended cylinders 45, their ends 46 having pistons 47 which project into sockets 48 in the slide 11 and their ends 49 having pistons 50 which are connected to a crosshead 51, this crosshead being adapted to pull the slide 11 back into its inoperative position, by means of a tie rod 52, after the weld has been formed and the heated metal upset by an advance of the pistons 47. For controlling the admission and exit of a suitable fluid, such as water or oil, to and from the cylinders 46 and 49, a valve 53 is provided; this valve being designed to admit fluid under pressure to either the forward or return cylinders and simultaneously allow fluid to escape from the others of such cylinders. The cylinders 13 and 14, which operate the clamping jaws 28 and 29, may be similarly controlled or actuated by a valve 54, this valve operating in substantially the same manner as the valve 53, just described. A switch (not shown), controlled by a treadle 55, is provided for making and breaking the electric circuit through the ends or edges 42 and 43 when the work is positioned between the clamping jaws 28 and 29.

In Figs. 7 to 10, inclusive, one method of forming split blanks is illustrated. Fig. 7 shows a flat piece of bar or plate stock 56; Fig. 8 shows the same piece after the completion of an initial bending operation performed between similarly shaped dies, the piece being folded into a centrally arched section having upturned ends, each central section and upturned ends being substantially semi-circular and tangent to each other; Fig. 9 depicts the same piece after a succeeding bending operation during which the central arch 57 is forced radially in an opposite arcuate direction into a curve having about the same peripheral shape as the preformed ends, whereby a maximum mechanical working in a radial direction is imparted to the fibrous structure of the tube blank; and Fig. 10 shows the final closing operation as performed between suitably contoured dies 58 and 59, this operation producing the annular or tubular-shaped article shown in Fig. 5, which, after having been welded, presents the appearance shown in Fig. 6.

The welding operation is carried out by positioning a split blank between the elevated clamping jaws 28 and 29, these jaws then being forced down by manipulating the valve 54 to thereby bring the edges 42 and 43 into closely contacting relation to each other and to the electrodes 34 and 35, such contacting, as heretofore explained, being produced and the work firmly clamped by the slip-over action of the cams 31 and 32. The article now appears as shown in Figs. 2 and 3, the split between its adjacent edges 42 and 43 being located on the lower side and between the electrodes 34 and 35. After clamping the work, the electrodes may be placed in circuit by operation of the treadle 55, whereupon, the contacting edges of the work, as the only conducting path open, will become highly heated, due to the passage therethrough, or across, of the usual heavy welding current. When such edges have reached a sufficiently high temperature the valve 53 may be manipulated to actuate the pistons 47, these pistons, as previously explained, pushing the slide 11 and the clamping jaw 28 towards the other and stationary clamping jaw 29, this operation having the effect of forcing the molten or highly heated edges of the work into intimate and welding contact and upsetting such metal to form a "flash" 60, as shown in Fig. 6. After completion of the weld, the article may be released by suitably manipulating the valves 53 and 54, the current being cut off by means of the switch-actuating treadle 55. The articles thus produced, say hubs for wire spoked vehicle wheels or dynamo-electric machine fields, may be subsequently finished, at least so far as the welding operation is concerned, by cutting or grinding off the flash 60 and dressing the weld in the usual manner, subsequent machining and other operations being greatly facilitated by protecting or guarding the inside surface of the work from flying molten metal produced during the welding; a guard or protector 61 being provided for this purpose.

The arrangement and form of the jaws 28 and 29 will be seen to permit such jaws to contact with substantially the entire periphery of the tubular articles to be welded, thereby insuring a true cylindrical contour for the article after the welding process has been completed. The insulating material 26 which separates the jaws from the remainder of the clamping mechanism prevents current from passing through any portion of the article to be welded except the ends which are heated and welded. The main body of the article is therefore kept relatively cool which also assists in keeping the article in true cylindrical form. The shield member 61 not only protects the article from the flying metal during the upsetting operation but also serves as a heat shield between the heated joint and the inner periphery of the article during the interval when the ends are heated preliminary to the upsetting operation. The member 61 also serves as a support for the article to be welded after such article has been placed in the machine by the operator and before the jaws 28 and 29 are brought into clamping position.

From the foregoing description it will be apparent that this invention provides a rapid method of welding the ends or edges of generally tubular-shaped articles of small diameter, it being understood that the clamping jaws have an internal contour adapting them for exerting uniformly distributed pressure on the outsides of articles positioned therebetween and that fluted or circumferentially bulged as well as straight articles can be welded by using jaws that define an article receiving space of suitable shape. Also it will be noted that the electrodes are closely positioned to the edge or end metal to be heated and that the actual welding occurs subsequently to the electrical resistance heating operation during which the edges are raised to a welding temperature preliminarily to the upsetting and uniting of the fused metal.

Other modes of applying the principle of our invention may be employed instead of the one explained, change being made as regards the form or construction, provided the elements stated by the following claim or the equivalent of such stated elements be employed, whether produced by our preferred method or by others embodying steps equivalent to those stated in the following claim.

We therefore particularly point out and distinctly claim as our invention:—

In combination in apparatus for welding the spaced-apart ends of a generally ring shaped article, two spaced-apart frames and means whereby said frames may be moved in a plane toward and away from each other with a parallel relation maintained therebetween, two clamping jaws, one mounted in each frame and each having an inside contour adapted to encompass substantially half the outside surface of an article to be welded, means adapted to move said jaws normally to the plane defined by movement of said frames, and two electrodes, one mounted on each frame and movable therewith and adapted to engage an article clamped in said jaws at a point closely adjacent an end of said article.

JACOB S. FENZEL.
HARRY H. BOUND.